W. R. UHLEMANN.
EYEGLASSES.
APPLICATION FILED DEC. 20, 1913.
1,120,767.
Patented Dec. 15, 1914.
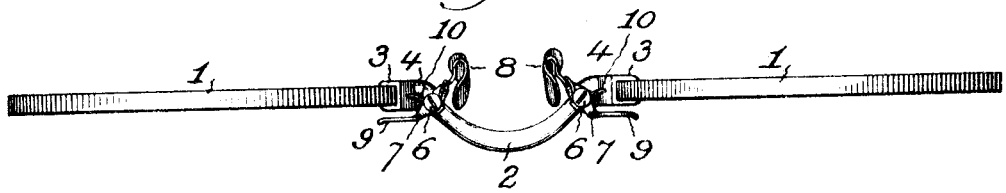
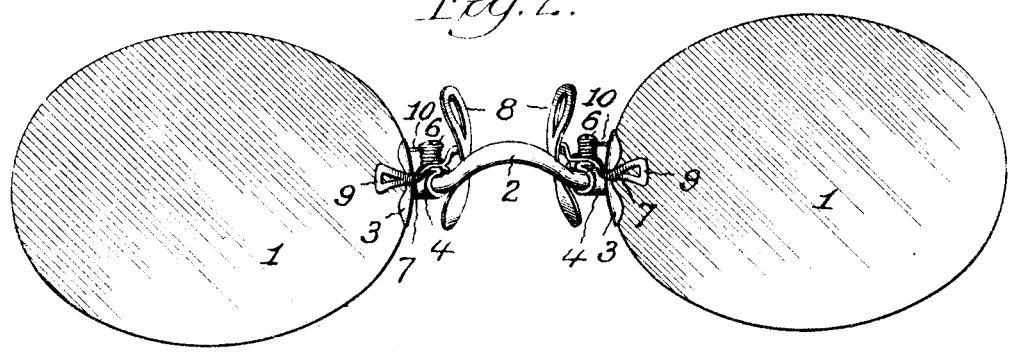
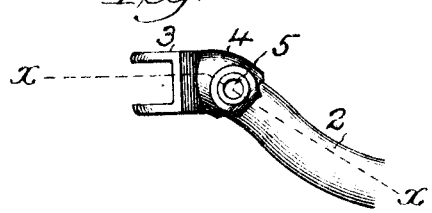
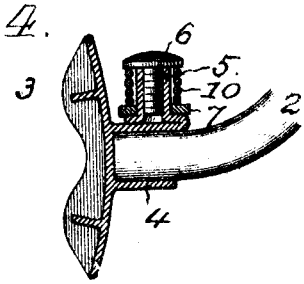
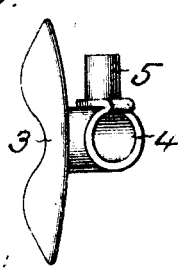
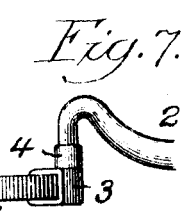
Witnesses:
John Enders
H Emm Moe
Inventor:
William R. Uhlemann
by Robert Burne
Atty.

UNITED STATES PATENT OFFICE.

WILLIAM R. UHLEMANN, OF CHICAGO, ILLINOIS.

EYEGLASSES.

1,120,767.  Specification of Letters Patent.  Patented Dec. 15, 1914.

Application filed December 20, 1912. Serial No. 807,833.

*To all whom it may concern:*

Be it known that I, WILLIAM R. UHLEMANN, a citizen of the United States of America, and a resident of Chicago, in the county of Cook, State of Illinois, have invented certain new and useful Improvements in Eyeglasses, of which the following is a specification.

This invention relates to attaching means for non-metallic bridges, temples or other accessories of eyeglasses and spectacles, and has for its object to provide a simple and effective structural formation and combination of parts whereby a strong and economical connection between the clips of rimless lenses and the bridges and other accessories of eyeglasses and spectacles is effected, and with which, in addition, a very close arrangement of the axes of the lenses, with ample span of the connecting bridge is attained.

A further object is to provide in connection with the above mentioned intermediate attachment, means for the support of finger piece mountings of eyeglasses and the operating springs therefor, all as will hereinafter more fully appear.

In the accompanying drawings: Figure 1, is a top view illustrating the present invention as applied to "finger piece" rimless eyeglasses. Fig. 2, is a front elevation of the same. Fig. 3, is an enlarged detail plan view of the clip and bridge of the same. Fig. 4, is an enlarged detail sectional elevation on line *x—x*, Fig. 3. Fig. 5, is a detail side view of the clip, illustrating the formation thereon of the hollow post for the finger piece lever and operating spring. Fig. 6, is a like view of another type of the same. Fig. 7, is a detail plan view of a modified form of the present invention.

Similar reference numerals indicate like parts in the several views.

Referring to the drawings, 1 represents the lenses of a pair of eyeglasses or spectacles of the rimless type, and which are connected together by a connecting bridge 2, which in the present improvement consists of a transparent or semi-transparent material which is ductile and capable of being worked into shape under a moderate degree of high temperature, such material for example being glass or celluloid. Connecting bridges, etc., of the above described materials are necessarily circular or oval in cross-section, in order to attain the maximum amount of strength with the minimum amount of material, and the main part of the present improvement accordingly involves the following simple and economical construction whereby such specific form of bridges, etc., are connected in a substantial manner to the lenses of eyeglasses and spectacles.

3 is a clip member of any ordinary construction and fixedly attached in any usual manner to its lens member 1. The form shown in the drawing for the sake of illustration, is of a box type, adapted to be cemented to the rim of the lens member aforesaid.

4 is a tubular socket member fixedly connected to the clip member 3 near the middle of the same, and in the preferred form of the present invention said socket member projects in an oblique and substantially horizontal direction from the clip member 3, as shown in Figs. 1, 2 and 3. The purpose being to attain an extended length of the socket member without material increase in the distance between the optical centers of the lenses and without a reduction in the span of the connecting bridge 2. The bore of said tubular socket member 4 is preferably of a uniform diameter, and is either of a circular or oval form in cross-section, so as to receive the correspondingly formed end of the connecting bridge 2, which in an assemblage of parts is fixedly connected or otherwise secured therein.

5 is a tubular post secured to the tubular socket member 4, in adjacent relation to the clip member 3. Said tubular post is formed with a screw-threaded bore for the reception of the shank portion of the headed screw 6 by which the lever and spring of the hereinafter described finger piece mounting is supported in place. The construction being such that with the screw 6 in place its head portion will have bearing against the top of the tubular post 5, so that sufficient frictional contact may be attained at such point, to prevent accidental disengagement of the screw and the parts confined thereby during continued actual use. The tubular post 5 may be formed as a separate piece and brazed in place on the socket member 4, as illustrated in Fig. 6, or it may constitute an integral part of said socket member, as illustrated in Fig. 5.

7 is the lever of the finger piece mounting above referred to. Said lever has pivotal bearing on the base portion of the tubular post 5, and carries on its rear end a nose-grip member 8, while its front end is formed with the usual enlargement 9 for convenient manipulation by the fingers of the user in applying the eyeglasses to the nose, and in the removal of the eyeglasses after use.

10 is a spring of any usual form encompassing the tubular post 5, with one end in operative engagement with the lever 7, and the other end in abutment engagement with the clip 3, or other fixed part of the eyeglass, the construction being such as to provide a yielding stress upon the lever 7 to move the same in a direction which will cause the nose grip 8 to bear against the nose of the wearer.

The construction shown in Fig. 7, is more especially adapted for spectacles, and affords a very close arrangement of the optical centers of the spectacle lenses and at the same time provides an ample span of the connecting bridge 2.

While my invention is more especially adapted for use in connection with transparent or semi-transparent non-metallic bridges, the scope of the present invention embraces, the application of my specific construction heretofore described to the attachment of spectacle temples of the material above described, to their pivot members.

Having thus fully described my said invention what I claim as new and desire to secure by Letters Patent, is:—

1. In an eyeglass, the combination of a pair of lenses, a connecting bridge of non-metallic material and having a rounded cross-section, and a pair of lens clips engaging the lenses and having tubular socket extensions adapted to receive the ends of the bridge, the said tubular extensions being disposed in an oblique direction with relation to the plane of the aforesaid clips and lenses, substantially as set forth.

2. In an eyeglass, the combination of a pair of lenses, a connecting bridge of non-metallic material and having a rounded cross-section, a pair of lens clips engaging the lenses and having tubular socket extensions adapted to receive the ends of the bridge, and tubular posts mounted on said socket extensions and adapted to support the carrying levers and actuating springs of a pair of nose grips, substantially as set forth.

Signed at Chicago, Illinois, this 17th day of December, 1913.

WILLIAM R. UHLEMANN.

Witnesses:
ROBERT BURNS,
HENRY MOE.